Nov. 7, 1961  W. G. SYKES  3,007,710
COLLAPSIBLE CART
Filed March 31, 1959
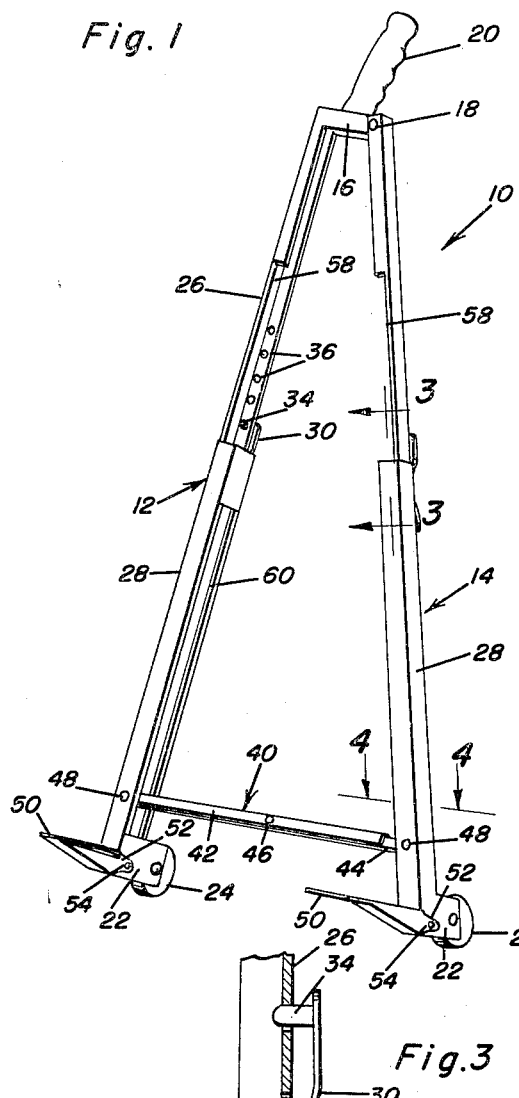
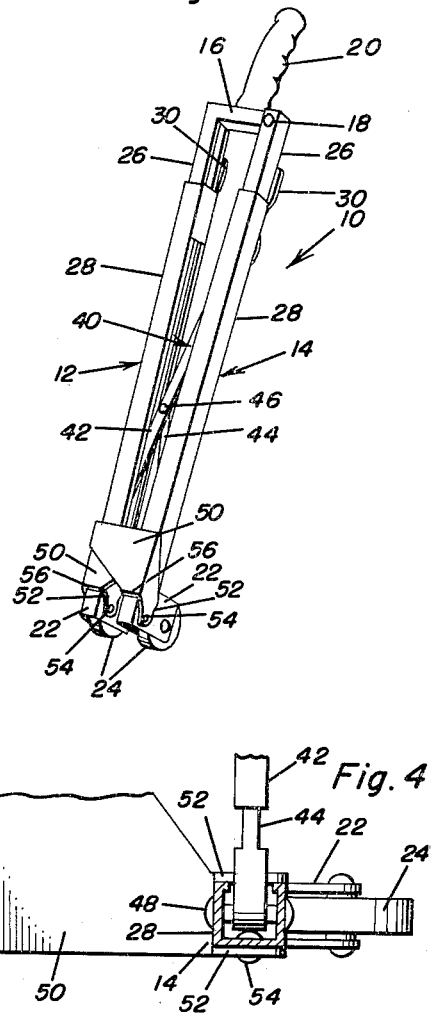
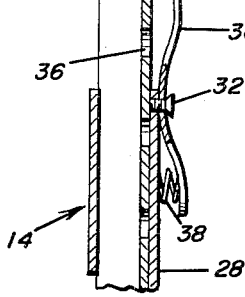
William G. Sykes
INVENTOR.

3,007,710
COLLAPSIBLE CART
William G. Sykes, % J. W. Willis Motors Co., Havelock, N.C., assignor of ten percent to Charles O'H. Grimes, Raleigh, N.C.
Filed Mar. 31, 1959, Ser. No. 803,327
6 Claims. (Cl. 280—42)

This invention relates to collapsible carts and is a refiling of application Serial No. 372,055, filed August 3, 1953, for collapsible cart, now abandoned.

The principal object of the invention is to provide a cart of the character herein described, which may be conveniently and effectively employed for transporting luggage, cases of beverage from a truck to a store, or for any other similar function where it is desirable to transport, over a comparatively short distance, a load which cannot be conveniently carried.

An important feature of the invention resides in its collapsibility which permits the cart to be quickly and easily folded into a very compact form so that it may be stored in a small amount of space when the use thereof is not desired.

Some of the advantages of the invention reside in its simplicity of construction, in its efficient and dependable operation, and in its adaptability to economical manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the invention in readiness for use;

FIGURE 2 is a perspective view of the invention in its folded position;

FIGURE 3 is a fragmentary sectional detail taken substantially in the plane of the line 3—3 of FIGURE 1; and FIGURE 4 is a sectional detail taken substantially in the plane of the line 4—4 of FIGURE 1.

Referring now to the accompanying drawings in detail, the collapsible cart is designated generally by the reference character 10 and embodies in its construction a pair of upwardly extending leg members 12, 14, the leg member 12 being provided at the upper end thereof with a transversely extending, rigid member 16 onto which the upper end of the leg member 14 is pivotally connected by means of a pivot 18, so that the leg members 12, 14, may be swung toward and away from each other.

The transverse member 16 is provided with a rigid handle 20, and it will be also noted that the lower ends of legs 12, 14, are equipped with suitable brackets 22 in which are rotatably mounted travelling wheels 24.

Each of the leg members 12, 14, is of a substantially box-shaped cross section and consists of a pair of slidably telescoped sections 26, 28, whereby the leg members may be adjusted from an extended operative position as shown in FIGURE 1, to a folded, slidably telescoped position, as shown in FIGURE 2.

However, means are provided releasably locking the leg members in their extended positions, these means consisting of a pair of locking strips 30 which are fulcrumed to the upper ends of the leg member sections 28 by suitable fulcrum pins 32 and are provided at one end thereof with locking elements or detents 34. These detents are receivable selectively in rows of apertures 36 formed in the leg member sections 26, and suitable compression springs 38 are interposed between the strips 30 and the associated leg member section 28, so as to urge the detents 34 into the apertures 36.

In order to releasably sustain the leg members 12, 14, in an operative, downwardly divergent position, a collapsible brace unit 40 extends transversely between the lower end portions of the leg members. This brace unit consists of a pair of complemental sections 42, 44, which are pivotally connected together by a pin 46 and are connected at the outer ends thereof by suitable pivot pins 48 to the lower end portions of the sections 28 of the respective leg members 12, 14, as will be clearly understood. Accordingly, when the brace 40 is in the position shown in FIGURE 1, the leg members 12, 14, are separated so that the cart is in readiness for use. On the other hand, when the brace 40 is collapsed, the leg members 12, 14, are drawn together as illlustrated in the accompanying FIGURE 2.

Means are provided for supporting a load on the cart, these means consisting of a pair of substantially triangular load supporting plates 50 which are equipped with pairs of spaced ears 52 so that they may be foldably attached to the lower end portions of the leg member sections 28 by suitable pins or rivets 54. In this manner, the plates 50 may be disposed either in inoperative folded positions, as shown in FIGURE 2, wherein they are substantially parallel to the leg members 12, 14, or they may be swung outwardly and downwardly to an operative position as shown in FIGURE 1, wherein the plates 50 are disposed at substantially right angles to the leg members. It will be observed that in this latter position, the lower edges 56 of the plates 50 abut the surfaces of the leg members, so as to function at stops in maintaining the plates 50 in their operative positions.

When the supporting plates 50 are folded to their inoperative positions, they overlap each other as shown in FIGURE 2.

It will be also observed that the sections 26 of the leg members 12, 14 are recessed as indicated at 58 and that the sections 28 of the leg members are similarly recessed as indicated at 60, so as to provide clearance for the brace unit 40 when the latter is in its collapsed position and the sections 26 are slidably telescoped in the sections 28, as shown in FIGURE 2.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A collapsible hand truck comprising a pair of upwardly extending leg members pivotally connected at the upper ends thereof and movable towards and away from each other, said leg members each comprising a pair of longitudinally slidably telescoping sections, means for adjustably locking said sections in an adjustably extended relation, a longitudinal handle at the upper end of said leg members, a pair of traveling wheels provided at the lower ends of the respective leg members, load supports pivotally attached to said leg members, and means interconnecting the leg members in spaced relation to the wheels for locking the leg members in a downwardly divergent relation and allowing the hand truck to pass over obstructions.

2. A collapsible cart comprising a pair of upwardly extending leg members pivotally connected at the upper ends thereof and movable towards and away from each other, said leg members each comprising a pair of slidably telescoping sections, means for adjustably locking said sections in an adjustably extended relation, a handle at the upper end of said leg members, a pair of traveling wheels provided at the lower ends of the respective leg members, load supports foldably attached to said leg members, and means for locking the leg members in a downwardly divergent relation, said means for locking the leg members including a collapsible brace extending between and pivotally connected to intermediate portions of said leg members and allowing the hand truck to pass over obstructions, said load supports being swingable from a folded position against said leg members to an operative position, and means on said load supports engaging said leg members for holding said load supports substantially normal to said leg members in operative position.

3. A collapsible cart comprising a pair of leg members, each of said leg members consisting of a pair of telescopic sections, means interconnecting the sections for retaining the telescopic sections in longitudinally adjusted position, the upper end of one of said sections having a lateral member rigid therewith, the upper end of the other leg member being pivotally connected to the free end of the laterally extending member for swinging movement of the leg members towards and away from each other, a longitudinally extending handle rigid with the laterally extending rigid member and extending longitudinally from the leg members, the lower end of each leg member having a wheel journaled thereon and offset rearwardly from the leg members for rollingly engaging a supporting surface, means adjustably interconnecting the lower end portions of the leg members for retaining the lower ends of the leg members spread apart with the leg members in downwardly diverging relation but permitting inward movement of the leg members to a collapsed position in which the leg members are disposed alongside of each other, said means interconnecting the leg members being spaced above the wheels thus enabling the cart to pass over obstructions, and load supporting means mounted on each of the leg members adjacent the lower end thereof and projecting forwardly from the leg members for supporting a load thereon.

4. The structure as defined in claim 3 wherein said means interconnecting the lower end portions of the leg members includes a pair of brace members pivoted to each other and respectively pivoted to the leg members, one of said brace members being in the form of a downwardly opening channel-shaped member receiving the other of the leg members and extending beyond the pivot point for limiting the downward pivotal movement of the brace members to a position generally in alignment with each other whereby the brace members may pivot upwardly about the pivotal connection to each other and the pivotal connection between the brace members and the leg members but can only pivot downwardly to a position in which the brace members are substantially aligned with each other for retaining the leg members in downwardly diverting relation.

5. The structure as defined in claim 4 wherein said load supporting means includes a pivotal load supporting plate mounted on the lower end of each leg member for swinging movement to a position against the front surface of the leg member, the plates forming the load supporting surface extending inwardly towards each other and adapted to overlie each other when the leg members are disposed in collapsed position thereby enabling the cart to be folded and collapsed to a compact condition for ease of storage and transportation.

6. A collapsible hand cart comprising a pair of leg members, means pivotally interconnecting the upper ends of the leg members for swinging movement towards and away from each other, handle means attached to the upper end of one of said leg members for propelling the device, each of said legs being telescopically adjustable, spring detent means releasably retaining the leg members in longitudinally adjusted relation, each leg having rearwardly extending brackets at the bottom end thereof, a wheel rotatably supported from the rearwardly extending brackets on each leg member for rollingly engaging a ground surface, a two piece brace member interconnecting the leg members above the rearwardly extending brackets whereby the hand truck may pass over obstructions of a diameter greater than the wheels, the two pieces of the brace having ends pivotally attached to the respective leg members and having means pivotally interconnecting the two pieces at the center thereof, one of said pieces extending into overlying relation to the other of said pieces for limiting the downward pivotal movement thereof to a position substantially in alignment with each other for retaining the leg members in downwardly diverging relation, a load supporting member pivotally mounted on the lower end of each leg member and extending forwardly therefrom, each load supporting member including an enlarged plate with a laterally extending portion, said laterally extending portions projecting towards each other thus forming two enlarged areas of support, said laterally extending portions adapted to overlie each other when the leg members are swung inwardly to an adjacent position, said leg members being of channel-shaped configuration with the open areas of the channels facing inwardly for receiving portions of the brace when the brace is in folded and collapsed condition.

References Cited in the file of this patent

UNITED STATES PATENTS

| | | |
|---|---|---|
| 649,300 | Hall | May 8, 1900 |
| 924,282 | Skipworth | June 8, 1909 |
| 2,200,889 | Mahr | May 14, 1940 |
| 2,519,113 | Cohn | Aug. 15, 1950 |
| 2,605,117 | Hooz | July 29, 1952 |
| 2,647,762 | Jamieson | Aug. 4, 1953 |
| 2,716,557 | Gould | Aug. 30, 1955 |
| 2,812,950 | Holloway | Nov. 12, 1957 |
| 2,932,526 | Campbell | Apr. 12, 1960 |

FOREIGN PATENTS

| | | |
|---|---|---|
| 1,001,698 | France | Oct. 24, 1951 |
| 191,534 | Germany | Oct. 10, 1907 |